(12) United States Patent
Reed

(10) Patent No.: US 6,202,359 B1
(45) Date of Patent: Mar. 20, 2001

(54) UNDER FLOOR STORAGE SYSTEM FOR BUILDING

(76) Inventor: Don Reed, P.O. Box 816, North Plains, OR (US) 97133

( * ) Notice: Subject to any disclaimer, the term of this patent is extended or adjusted under 35 U.S.C. 154(b) by 0 days.

(21) Appl. No.: 09/216,897

(22) Filed: Dec. 18, 1998

(51) Int. Cl.[7] ..................................................... B66B 9/00
(52) U.S. Cl. ........................... 52/31; 52/173.1; 312/268; 414/352; 414/399
(58) Field of Search ........................... 52/173.1, 29, 31, 52/202; 312/246, 247, 266, 268; 414/352, 399, 609

(56) References Cited

U.S. PATENT DOCUMENTS

| 3,287,058 | | 11/1966 | Wells . | |
|---|---|---|---|---|
| 3,331,645 | | 7/1967 | Vercellotti . | |
| 3,627,397 | | 12/1971 | Rominsky . | |
| 3,915,531 | * | 10/1975 | Morgan | 312/268 |
| 4,116,511 | * | 9/1978 | DiLiddo | 312/268 |
| 4,159,844 | | 7/1979 | Weiner . | |
| 4,296,984 | * | 10/1981 | Lehman | 312/268 |
| 4,354,611 | | 10/1982 | Propst et al. . | |
| 4,966,513 | | 10/1990 | Motoda . | |
| 5,011,239 | | 4/1991 | Guerin | 312/248 |
| 5,074,496 | * | 12/1991 | Rezag et al. | 414/399 |
| 5,108,163 | * | 4/1992 | Nakatsu | 312/268 |
| 5,135,102 | | 8/1992 | Sjogren et al. . | |
| 5,628,153 | | 5/1997 | Fontanez . | |

* cited by examiner

*Primary Examiner*—Michael Safavi
(74) *Attorney, Agent, or Firm*—Marger Johnson & McCollom, P.C.; Gregory T. Kavounas

(57) ABSTRACT

A storage system for a building such as a house. Specially sized containers are kept in the unused space under the raised floor of a building. An opening in the floor provides access, and is closeable by a cover. A translation means supports the containers, and moves them from exactly under the opening to a space for stowage. The preferred translation means includes a rail system supporting a train of serially coupled wagons. Each wagon has a guard sized to receive matingly one container. The train is moveable to align one of the wagons with the floor opening, for access of its container. A dust cover protects the contents. Being transparent, the cover allows quick inspection of the contents. A jack includes moving arms that push the container upwards through an opening in the wagon, and then also through the floor opening. The rail system includes rails that are closed loop, and are either attached to the underside of the floor, or supported by the grade. A drive moves the train by engaging at least one of the wagons. The system can be retrofitted in an existing building, or can be installed with a new building.

26 Claims, 8 Drawing Sheets

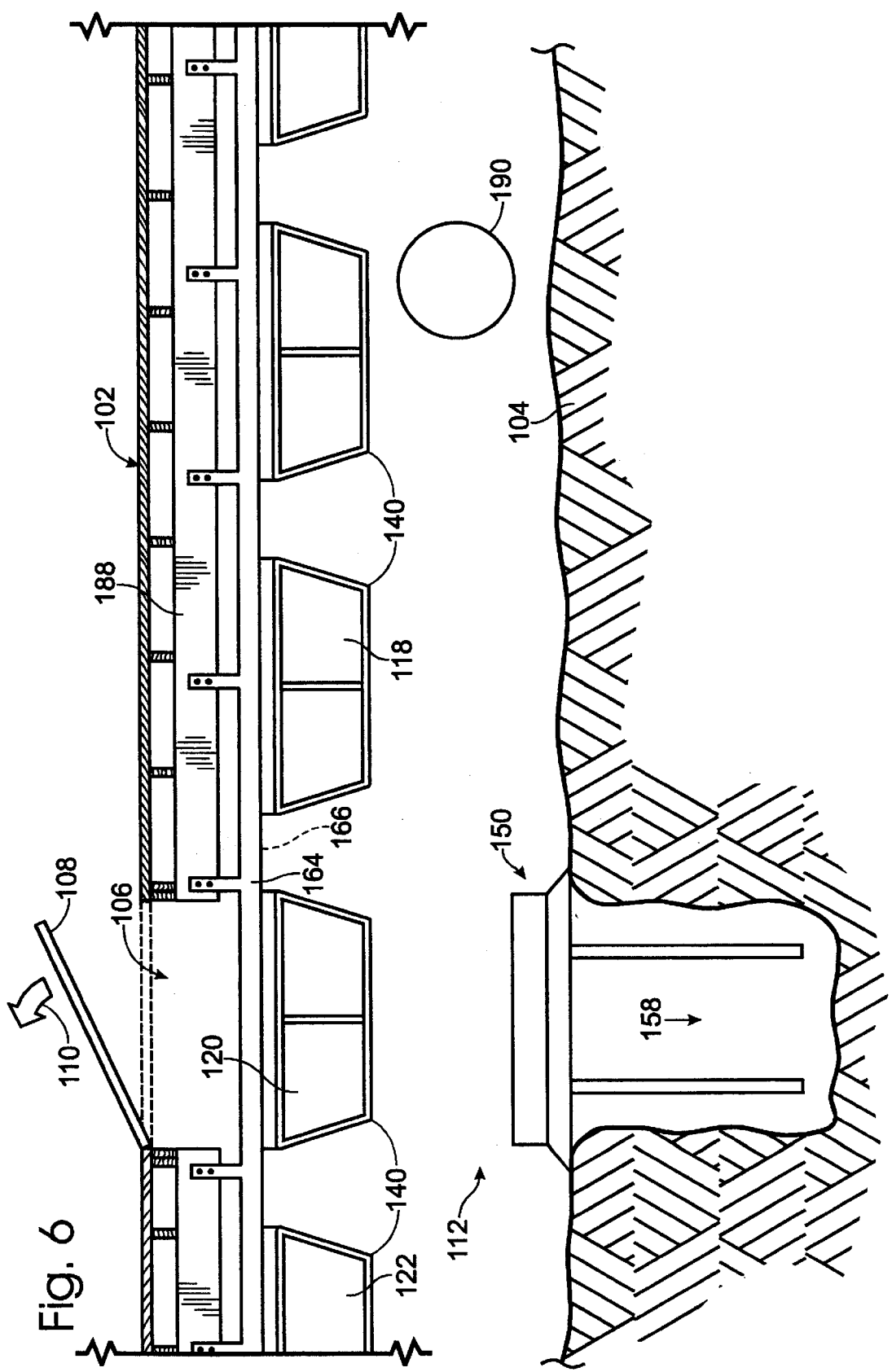

UNDER FLOOR STORAGE SYSTEM FOR BUILDING

BACKGROUND OF THE INVENTION

1. Field of the Invention

The present invention is related to the field of storage systems for buildings, and more specifically to a storage system for storing paraphernalia under the floor of a building such as a dwelling.

2. Description of the Related Art

Storage space for buildings is becoming increasingly scarce. All solutions (e.g. closets) command floor space commensurate with the volume of the paraphernalia, i.e. things that are to be stored. In other words, the more that needs to be stored, the more floor space is occupied.

Floor space comes at an increasing premium. The solution of including a basement in a house so as to store paraphernalia there is somewhat illusory—if the expense of a basement is justified in the first place, then the paraphernalia nevertheless still requires proportional floor space that could be used otherwise.

Accordingly a solution is desired that allows storage without using floor space that is proportional to the volume of the stored paraphernalia, and preferably without wasting any floor space at all.

BRIEF SUMMARY OF THE INVENTION

The present invention overcomes these problems and limitations of the prior art.

Generally, the present invention provides a storage system for storing paraphernalia in specially sized containers that are kept in the unused space under the raised floor of a building.

More specifically, the present invention provides an opening in the floor of the building. This is the only floor space that is used, regardless of how much paraphernalia is stored. The floor opening is closeable by a cover. This returns to use all the floor space.

The invention further includes a translation means for moving the containers from a proximate space (accessible through the floor opening) to a stowage space. The translation means can be a conveyor belt.

The preferred translation means includes a rail system positioned under the floor level. The rail system supports a train of serially coupled wagons. Each wagon has a guard sized to receive matingly one container. The train is moveable to align one of the wagons with the floor opening for access of its container. A dust cover protects the contents. Being transparent, the cover allows quick inspection of the contents, to decide whether to access them, or to move the train so as to access the container of another wagon. The container can thus be removed through the floor opening for easier access of its contents.

Preferably the storage system further provides a jack under the floor level. The jack includes moving arms that can push the container upwards through an opening in the wagon, and then also through the floor opening. Preferably the arms are operable only when a wagon of the train is exactly aligned under the floor opening.

The rail system includes rails that preferably are closed loop, which minimizes how much rail length is not used at any time. The rails are either attached to the underside of the floor, or supported by the grade preferably after it has been leveled.

The storage system further includes a drive for moving the train. The drive preferably engages at least one of the wagons.

The system of this invention can be retrofitted in an existing building, or can be installed with a new building. A particularly advantageous feature is that it provides storage while using very little floor space—that of the opening in the floor, which is even returned to other use.

These and other features and advantages of the present invention will become apparent and more appreciated after consideration of the Drawing(s) and Detailed Description of the Preferred Embodiment(s) of the invention.

BRIEF DESCRIPTION OF THE SEVERAL VIEWS OF THE DRAWING

FIG. 6 is a partial side view of the storage system of the invention, with the rails attached to an underside of the floor.

DETAILED DESCRIPTION OF THE PREFERRED EMBODIMENT(S) OF THE INVENTION

As has been mentioned, the present invention provides a storage system for a building. The preferred embodiment(s) of the invention are now described in detail with reference to the drawings.

Figure 1:
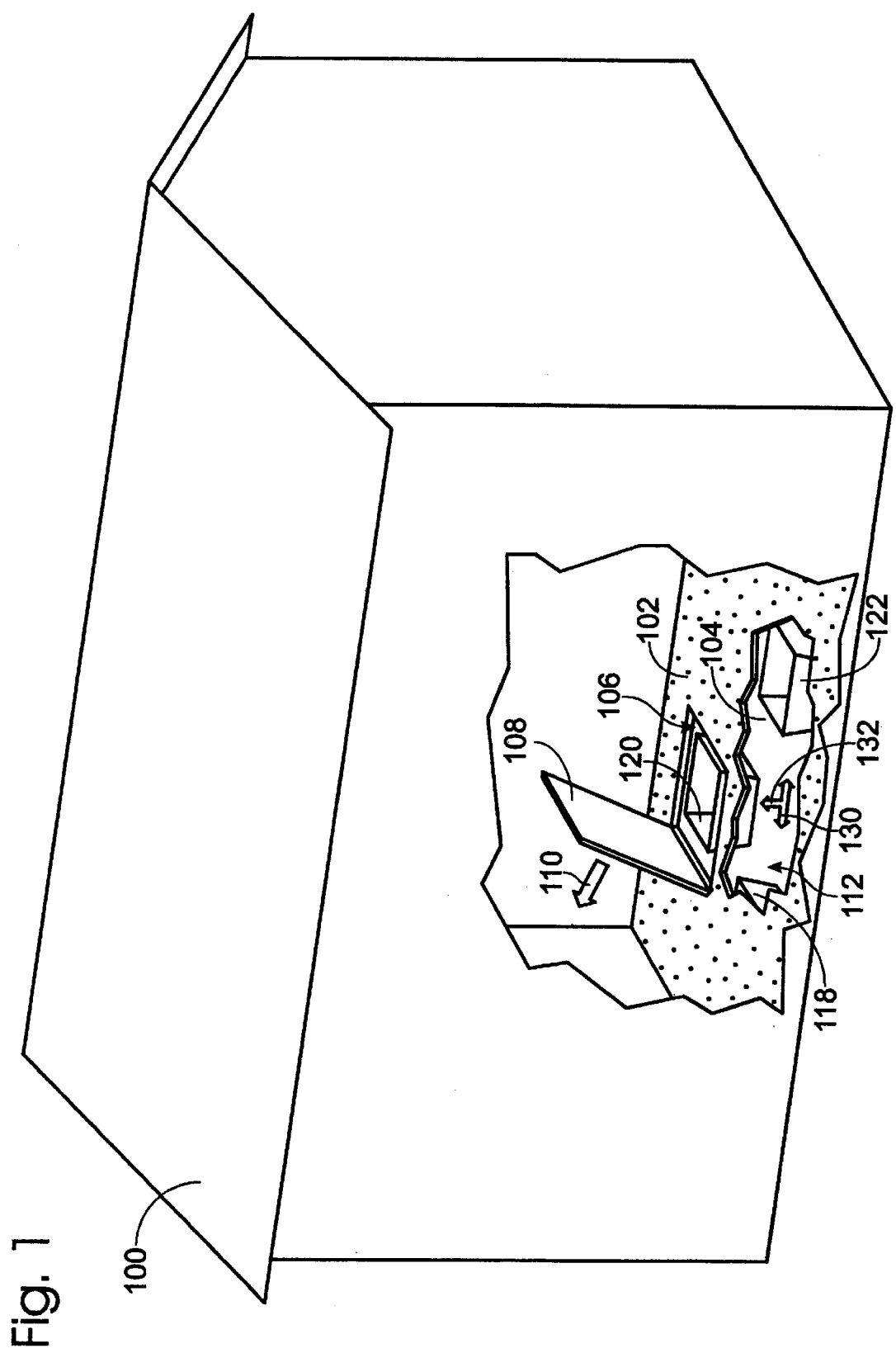
FIG. 1 is a perspective view of a series of containers shown relative to the floor of a building, and particularly relative to an opening in the floor according to the invention.

Referring to FIG. 1, a building 100 has a floor 102 that defines a floor level. Typically the floor is part of a raised foundation, provided over a grade 104. The building can be a dwelling or a commercial building or other.

According to the invention, a floor opening 106 is provided in the floor for accessing the space under the floor level. Such floor openings are typically provided for accessing the crawl space between the raised wood foundation and the grade. Such openings are typically provided in a closet under a stair case. Preferably a floor cover 108 is openable according to arrow 110, and closeable so as to close the floor opening.

The space below the floor level and close to the floor opening is defined as proximate space 112. It is generally directly below the floor opening. As such, much of the proximate space is accessible to someone who kneels, sits or lies on the floor near the opening, and reaches down through it. All the rest of the space under the floor opening is considered stowage spaces or space for stowage.

The storage system of the invention provides at least one container 120 under the floor level for storing paraphernalia. The container (also known as bin) is sized according to floor opening 106. Preferably a plurality of containers 118, 120, 122, are provided in series. As will be appreciated from the below, the containers of FIG. 1 are not shown with this invention's mechanism that supports them and moves them, to better convey how the invention appears to the user.

From the user's perspective, the series of containers is moveable sideways, according to arrow 130. As such, a different one of the containers can be presented at opening 106, for better access of its contents.

Optionally and preferably according to the invention, a container that is in the proximate space (that is, container 120 in FIG. 1) can also be raised according to arrow 132. This permits easier access of its contents, and is performed by a jack (not shown in FIG. 1) that is described in more detail later.

The invention further includes a translation means for supporting the containers, and for moving them from the proximate space (accessible through the opening) to the stowage spaces. The translation means can be a conveyor belt that supports the containers, and guides them along arrow 130. A guard rail guides the containers to remain on it where there are turns. The preferred translation means includes a rail system and wagons (not shown in FIG. 1).

Figure 2:
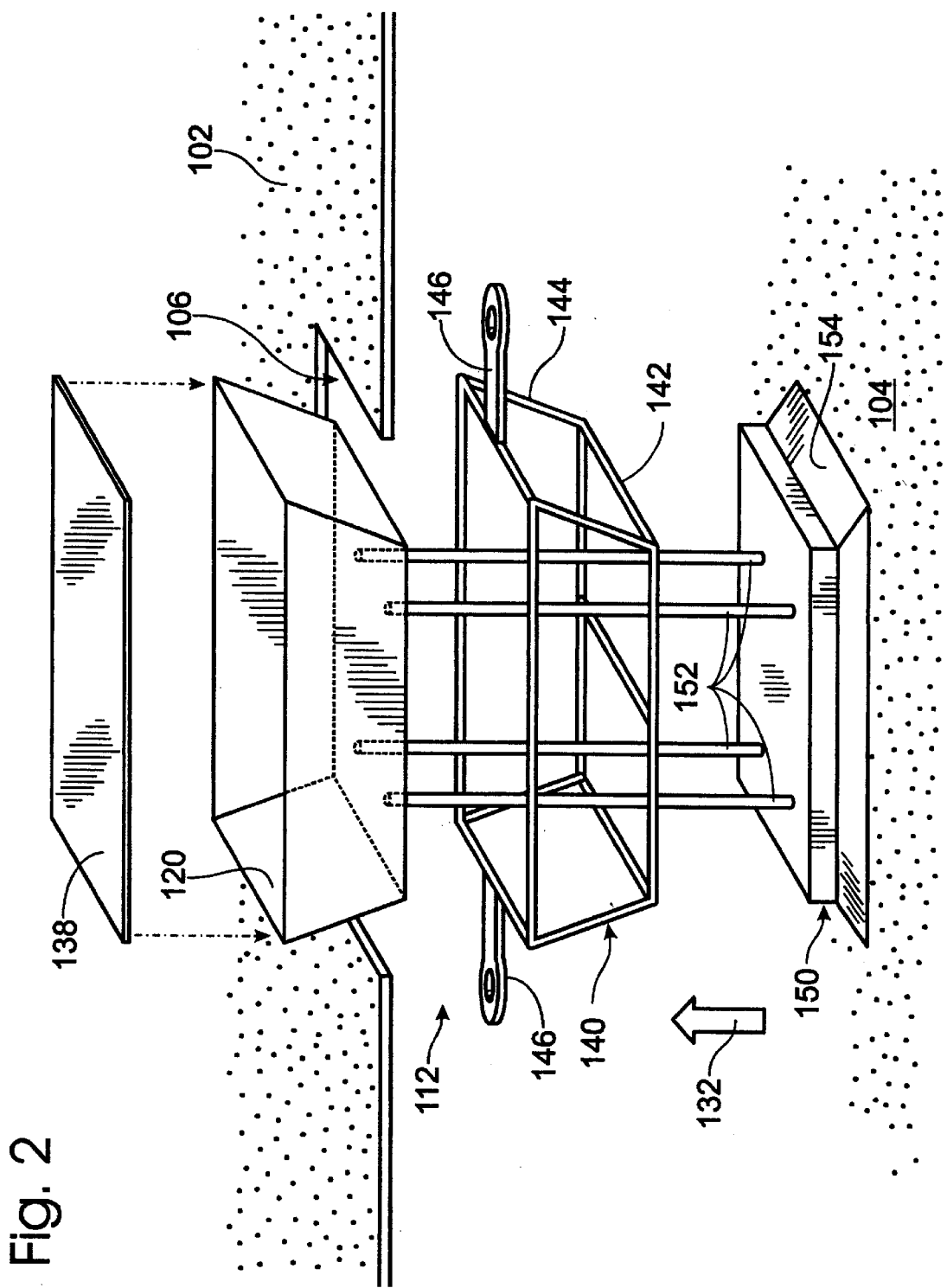
FIG. 2 is a perspective view of a wagon, a container and a dust cover made according to the invention, and of a jack with four arms pushing, through openings in the wagon, the container through the floor opening according to the invention.

Referring to FIG. 2, container 120 is provided with a dust cover 138. The dust cover (also known as lid) is preferably transparent, for allowing a quick inspection of its contents. The combination of the bin and the lid is preferably waterproof. The bin preferably has a raised lip for receiving the lid exactly in place, so that the latter does not fall off from any vibrations by the drive.

A wagon 142 supports the container. Preferably the wagon is individualized to each container. The wagon has a base 142, and a guard 144 that is sized to receive container 120 matingly, as the latter is dropped in from the top. The wagon also includes two arms 146 for coupling with other wagons, as explained in more detail later. In addition, the wagon has openings at the bottom.

Optionally and preferably a jack 150 is provided underneath the floor opening. The jack has four arms 152 that can move through the openings at the bottom of the wagon, to raise the container from the wagon through the floor opening as shown. Preferably the arms reach up to the floor level, at which time the container can be pulled aside onto the floor, and its contents sifted through the easiest.

The invention further provides a sensor for sensing the position of wagon 140 with respect to the proximate space. The sensor produces an output for the jack when the wagon is completely within the proximate space, at which time the container, if raised, would emerge through the floor clearing the floor opening.

The preferred way of constructing the wagon is in the shape of a frame. Not only is it the most economical, but also inherently leaves wide openings, which are easier to align with the arms of the jack. In any event, the wagon is preferably constructed from metal such as steel, and designed to carry a specified weight, e.g. 200 lbs.

Figure 3A:
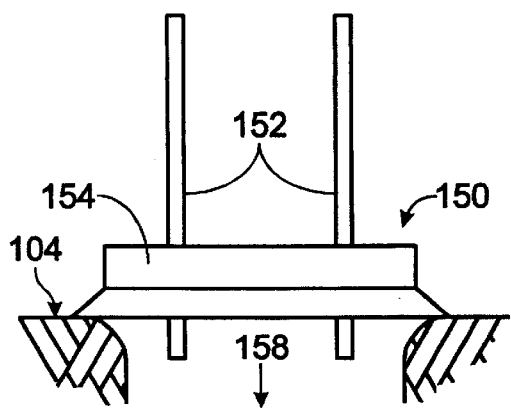
FIG. 3A is a side view of the jack of FIG. 2.
Figure 3B:
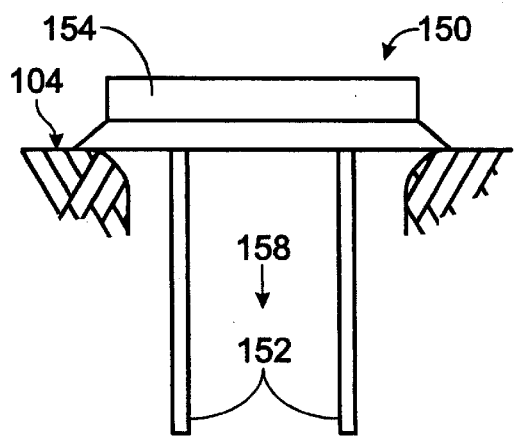
FIG. 3B is another side view of the jack of FIG. 3A, but with the arms retracted.
Figure 3C:
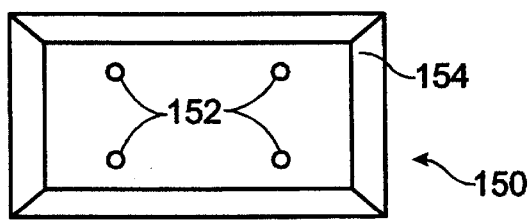
FIG. 3C is a top view of the jack of FIG. 3A.

The jack is now described with reference to FIGS. 3A, 3B and 3C. The jack is custom made for a system of the invention, as will be obvious to a person skilled in the art of lifts. One embodiment is given below, where the jack rests on the grade. Other embodiments are also possible, wherein the jack is suspended from an underside of floor 102.

Jack 150 has a base 154, and arms 152 that can extend upwards. The arms can be implemented hydraulically, as scissor lifts, a rack and pinion mechanism or other. The rack and pinion requires digging a narrow and deep hole 158 under where the base will be.

The preferred translation means further includes a rail system positioned under the floor level. The rail system supports the wagons, and guides them along a track that includes the proximate space and the stowage spaces.

The wagons are coupled with the rail system. This can be implemented in one of two ways. As a first example, a flexible unitary conductor has the wagons suspended from it, and the whole conductor moves along the track, along the principles of a ski lift. This embodiment can provide a space-efficient turning configuration at the corners, by including an additional mechanism.

In the preferred embodiment, the rail system includes rails that are in a fixed position. The wagons have wheels for rolling on the rails.

Figure 4:
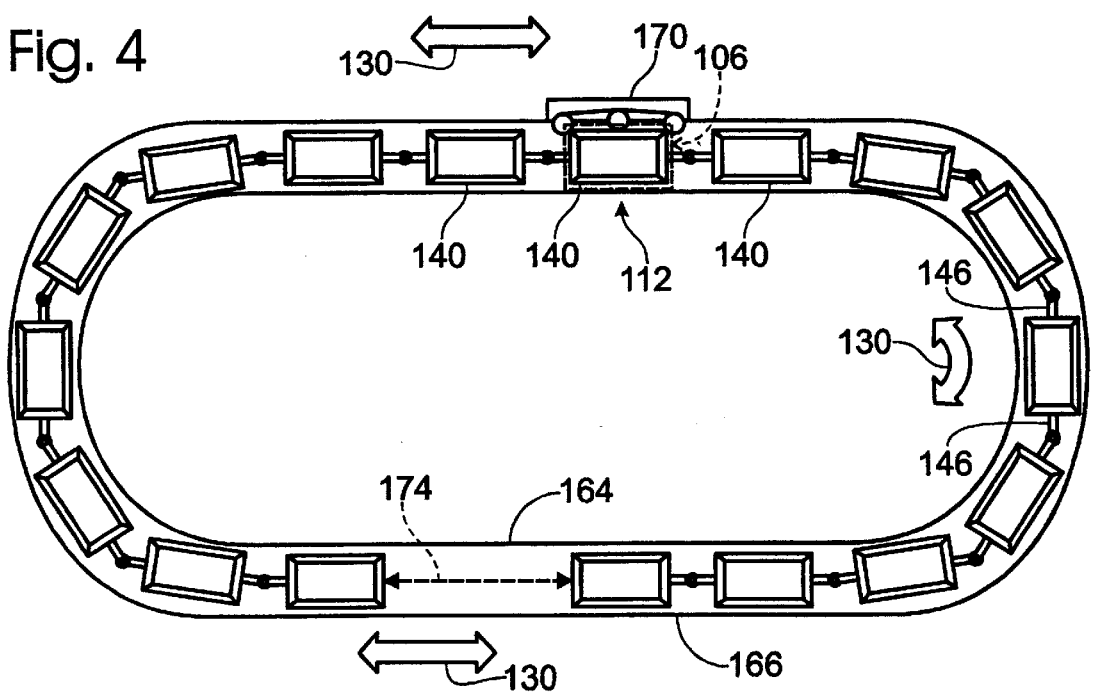
FIG. 4 is a top view of the rails of the rail system of the invention, forming a closed loop according to the invention.

Referring to FIG. 4, a pair of rails 164, 166 support the wagons, which are coupled with each other serially, thereby forming a train. A drive 170 engages at least one of the wagons, and thus moves the whole train according to arrow 130. The drive can thus place different wagons in the proximate space, under floor opening 106.

The rails are preferably configured in a closed loop. The advantage of a closed loop is that very little length 174 between the ends of the train goes unused. As the train is moved, length 174 is also moved according to arrow 130. With a proper drive, the length 174 can even be aligned with the floor opening, to allow a person to climb down to the space between the floor and the grade. That is why it is also preferred that jack 150 presents a flat base 154 when arms 152 are retracted, as seen in FIG. 3B. Accordingly, the floor opening can be coordinated to be the usual floor opening. It is preferred to include sensors for sensing the end of the train near floor opening 106 etc.

Figure 5:
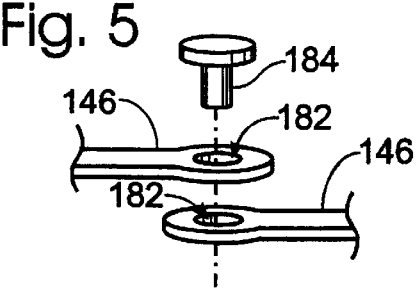
FIG. 5 illustrates how neighboring wagons of the train of FIG. 4 are coupled to each other.

The wagons are coupled as seen in FIG. 5. Each arm 146 that includes a hole 182 at the end. The arms of two neighboring wagons are brought together such that their arm holes 182 are aligned. A key 184 is inserted through holes 182, which permits the arms to rotate around each other.

Referring to FIG. 6, proximate space 112 is under floor opening 106. Rails 164, 166 are suspended from floor beams 188, straddle the floor opening, and bring forth one wagon 140 at a time to the proximate space. The interior of container 120 is accessible by leaning a little into the floor opening. In any event, jack 150 can raise the container through the floor opening. This embodiment permits a shorter jack, that may not even require digging a separate hole 158 into grade 104. This embodiment is also best suited for retrofitting an existing building. Such retrofitting may require adjustments in existing conduits, such as lowering an existing duct 190.

Figure 7:
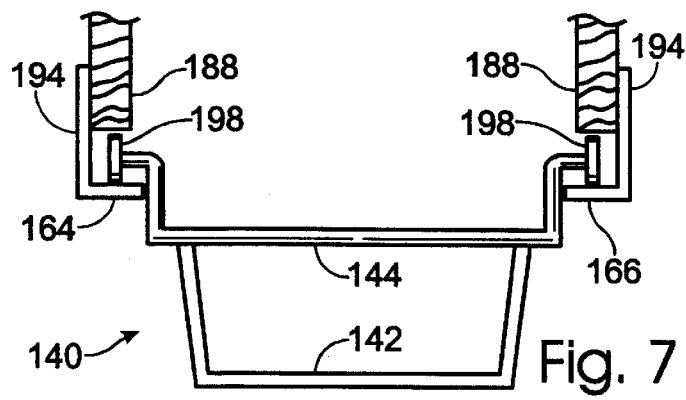
FIG. 7 is a section view showing a detail of how a wagon of the system of FIG. 6 is supported from the rails.

Referring to FIG. 7, rails 164, 166 are supported from beams 188 by brackets 194. The wagon rolls on the rails by wheels 198.

Figure 8:
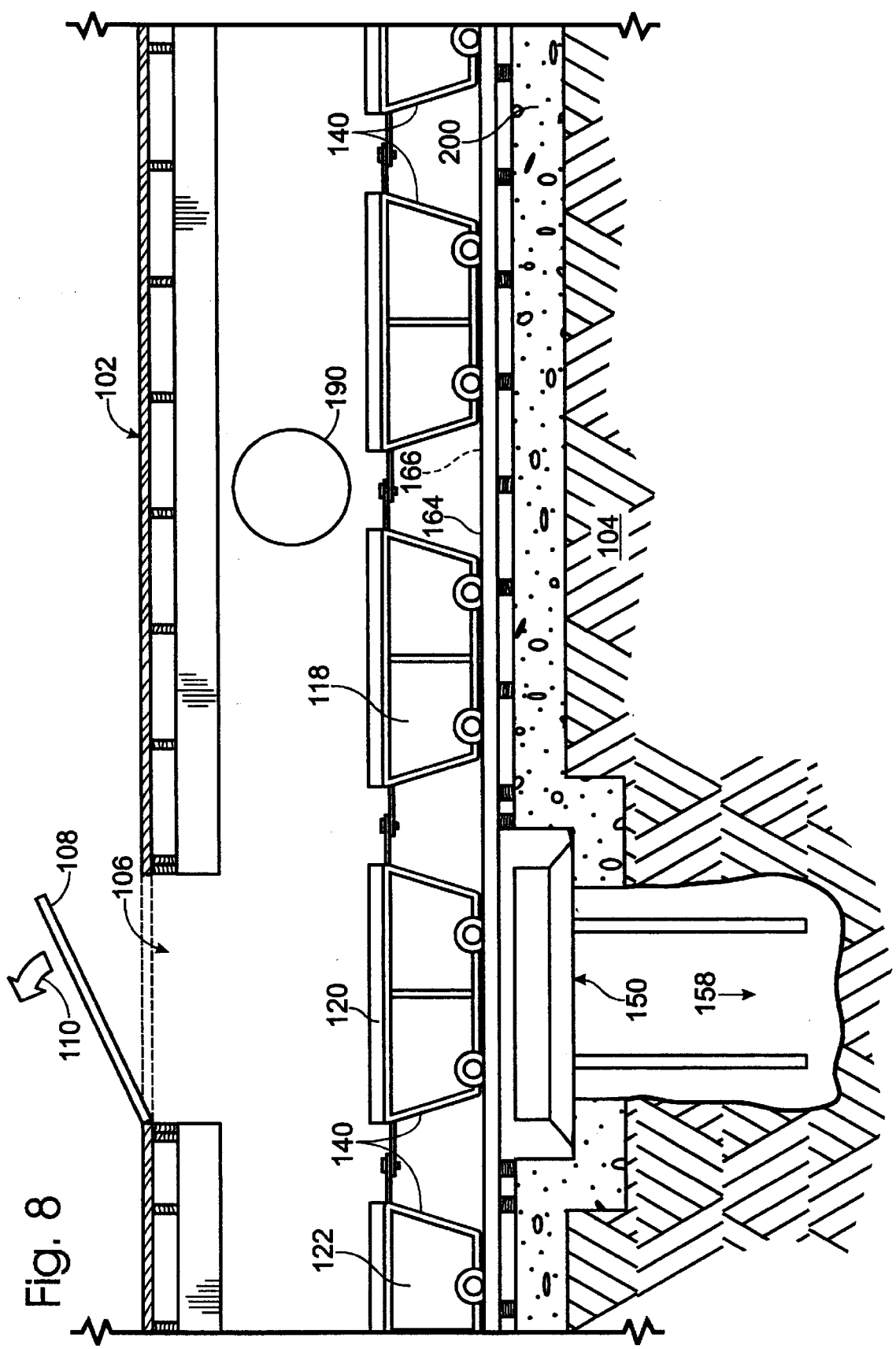
FIG. 8 is a partial side view of the storage system of the invention, with the rails supported by a grade under the floor.

Referring to FIG. 8, rails 164, 166 are alternately supported by grade 104. Preferably the grade has been leveled, and concrete 200 has been applied to it. In this configuration, the containers are also accessible through the crawl space.

Alternately, the rail can be attached midheight, e.g. from the foundation wall. That would be by adding metal while pouring concrete. This configuration may constrain the location of the floor opening to have to be near a wall.

Figure 9:
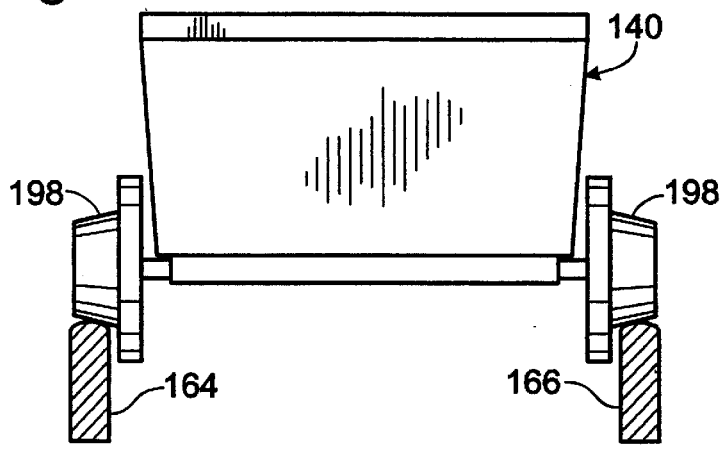
FIG. 9 is a section view showing a detail of how a wagon of the system of FIG. 8 is supported on the rails.

As seen in FIG. 9, wheels 198 are connected to a different portion of the wagon for this embodiment. Some art can be also drawn from the art of elevators.

Figure 10:
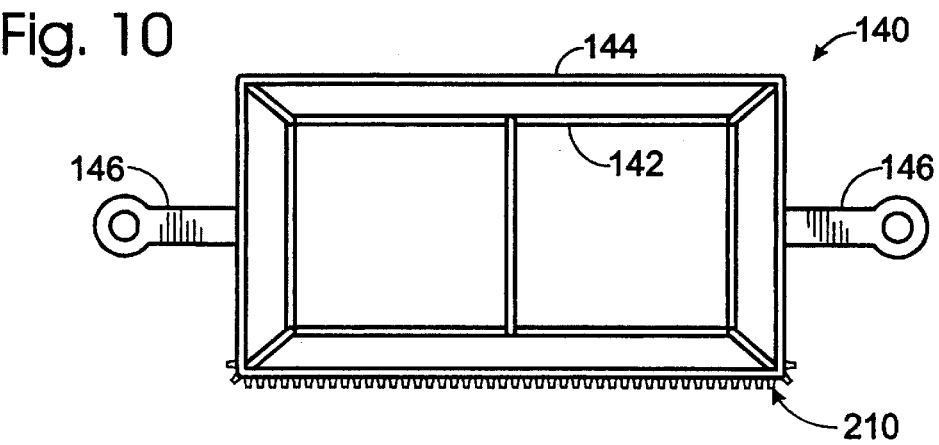
FIG. 10 shows a wagon made according to the invention, and also showing teeth on the wagon that will be used for engagement by a drive (not shown).
Figure 11:
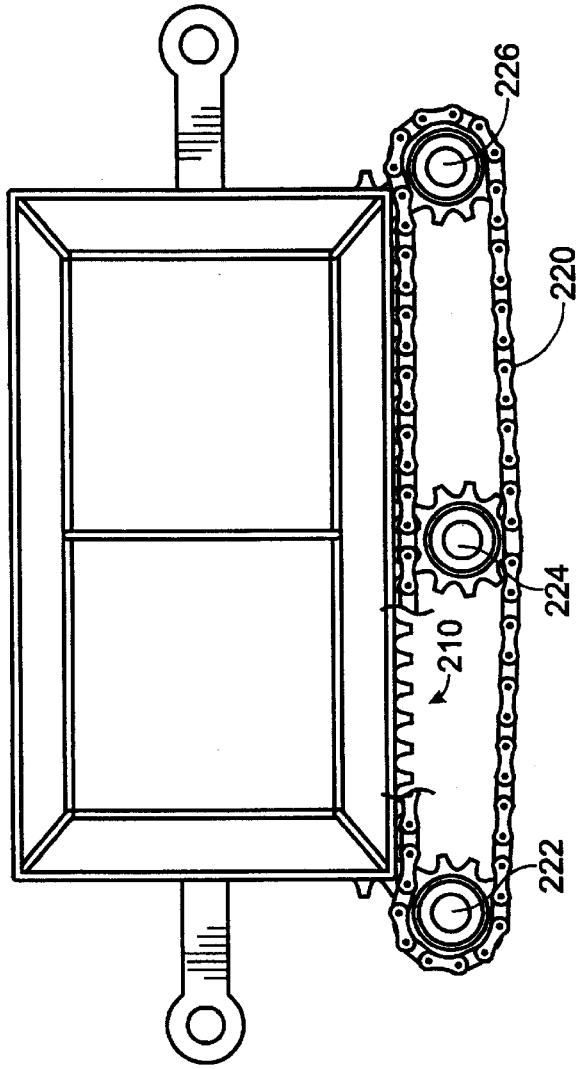
FIG. 11 is a top view of the wagon of FIG. 10, shown with a driving chain of a drive made according to the invention that engages the wagon.

Referring to FIG. 10, each wagon preferably has a set of teeth 210 for engagement by a driving chain of a drive. The engagement is seen better in FIG. 11. A bicycle-type driving chain 220 is moved by three turning spoked wheels 222, 224 and 226. The drive torques center wheel 224, which moves the chain, which moves the wagon, which thereby drives the entire train.

Figure 12:
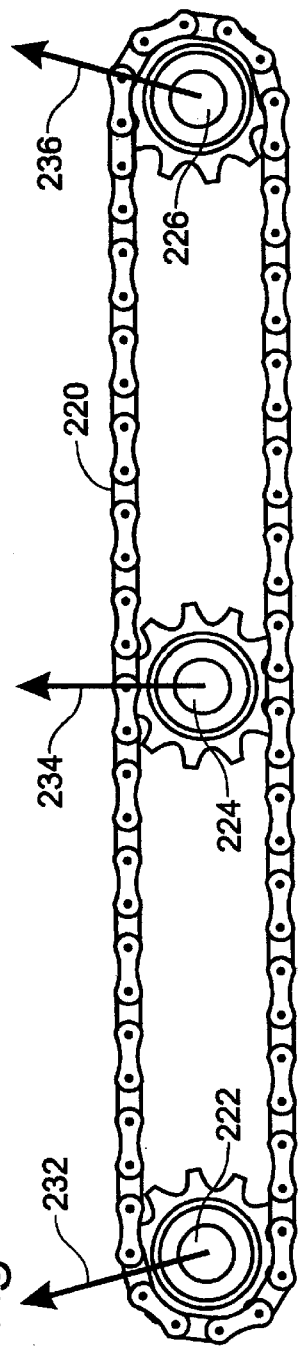
FIG. 12 shows the driving chain of FIG. 11, along with wheels that guide it, and the lateral bias force vectors on each wheel.

When a different wagon is being brought at the proximate space, the drive at some point will be engaging two wagons at once. This is best implemented by biassing spoked wheels 222, 224, 226 according to respective force vectors 232, 234, 236 against the wagon, as seen in FIG. 12. The wheels are also permitted to move by a limited amount in these directions, if there is no wagon in that direction. This also keeps the driving chain taught. End-of train sensors are implementable as a logic table between the displacements of the spoked wheels relative to each other. If it is desired to be able to also bring length 174 into the proximate space, a longer driving chain may be required, that spans more than one wagon length.

Figure 13:
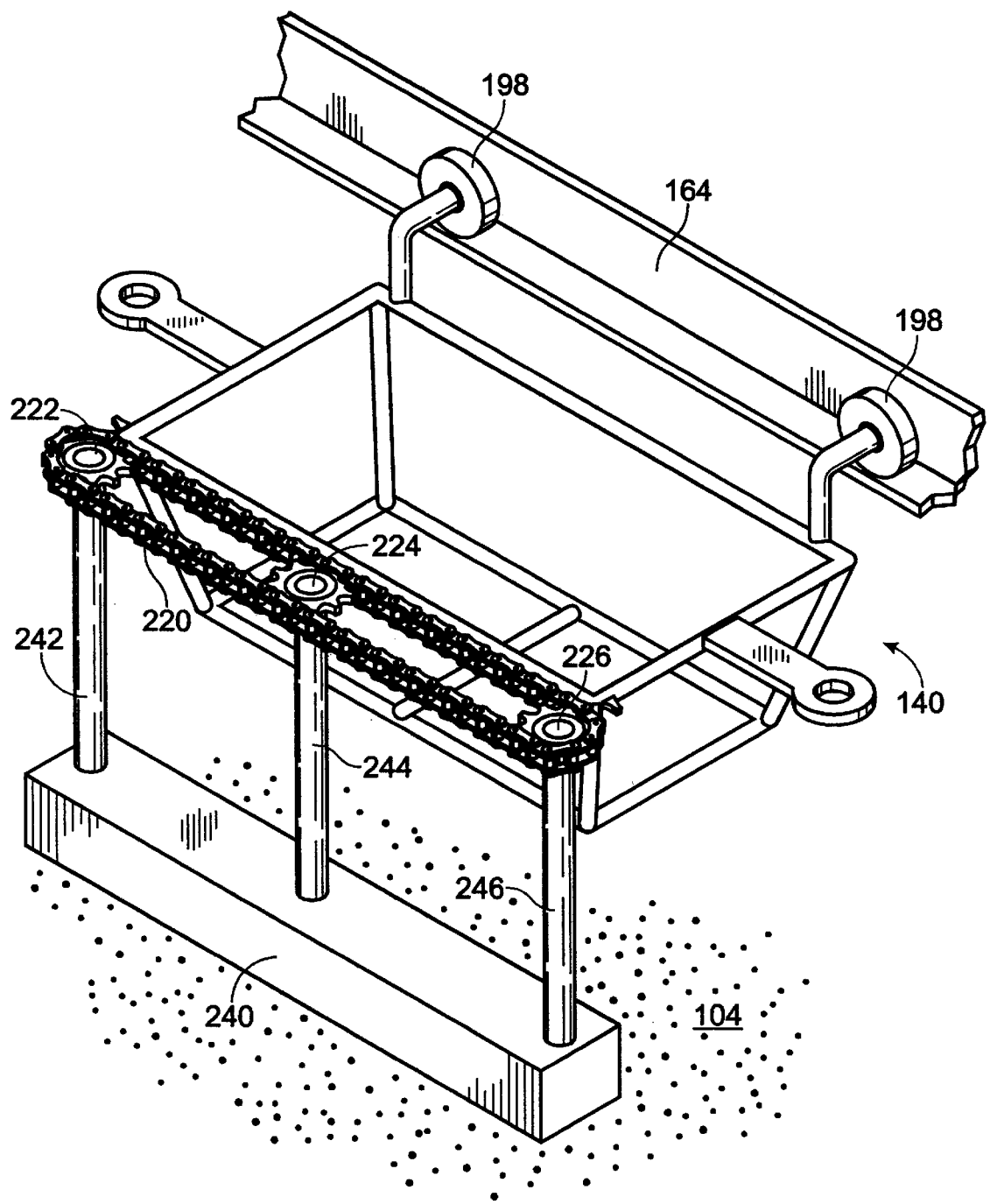
FIG. 13 is a perspective view of a drive relative to the wagon of FIG. 10.

Referring to FIG. 13, a custom made drive 240 is shown on grade 104. Three axles 242, 244, 246 hold spoked wheels 222, 224, 226 respectively. Axle 244 transmits torque, while the other two can be followers. All axles are tiltable somewhat in the direction of the forces of the vectors of FIG. 12, if there is no wagon there.

Drive 240 and the jack are waterproofed, receive power from the power supply of the building, and operable by pushbuttons. The buttons are preferably located into the proximate space, accessible when the floor cover is opened, but out of the way of the container that is being raised. The drive is also manually overridable, either by pushing the wagons, or by an additional crank applicable into one of the spoked wheels. Nevertheless a separate power generator is recommended for the drive and the jack.

In general a cataloguing system is recommended for keeping track of the contents of the containers. One example is using a grease marker to write erasably on the dust cover.

A person skilled in the art will be able to practice the present invention in view of the present description. In the present description numerous details have been set forth in order to provide a more thorough understanding of the present invention. It will be obvious, however, to one skilled in the art that the present invention may be practiced without these specific details. In other instances, well known features have not been described in detail in order to not obscure unnecessarily the present invention. Again, one skilled in the art will appreciate that it is possible to make various modifications, additions and substitutions to the present description without departing from the scope and spirit of the invention as claimed in the accompanying claims.

The invention claimed is:

1. For a building comprising a floor that defines a floor level, a storage system for storing paraphernalia therein comprising:
   an opening in the floor for allowing access to a proximate space that is below the floor level and close to the floor opening,
   at least one container for storing paraphernalia therein; and
   translation means for supporting the container at the proximate space and for moving the container from the proximate space to a stowage space that is below the floor level and distinct from the proximate space,
   wherein the translation means includes:
      at least one wagon for supporting the container thereon, the wagon movable from the proximate space to the stowage space, and
      at least one more wagon, the wagons being coupled with each other.

2. The storage system of claim 1, wherein the translation means includes a conveyor belt for serving the proximate space and the stowage space.

3. The storage system of claim 2, wherein the translation means further includes a guard rail for guiding the container to remain in the conveyor belt.

4. The storage system of claim 1, wherein at least one of the wagons includes a guard sized for receiving matingly the container thereon.

5. The storage system of claim 1, wherein the translation means further includes a drive for moving at least one of the wagons from the stowage space to the proximate space.

6. The storage system of claim 1, further comprising a sensor for sensing a position of at least one of the wagons relative to the proximate space.

7. The storage system of claim 1, wherein a first one of the wagons has at least one wagon opening, and wherein the storage assembly system further comprises:
   a jack positioned under the floor level, the jack including at least one arm moving through the first wagon opening for raising the container from the first wagon.

8. The storage system of claim 7, wherein the arm moves such that the container is raised through the floor opening.

9. The storage system of claim 1, wherein the translation means further includes a rail system for guiding the motion of at least one of the wagons from the proximate space to the stowage space.

10. The storage system of claim 9, wherein the rail system includes at least one rail that is configured in a closed loop.

11. The storage system of claim 9, wherein the rail system includes at least one rail that is attached to an underside of the floor.

12. The storage system of claim 9 wherein the floor is located above a grade, and wherein the rail system includes at least one rail that is supported by the grade.

13. For a building comprising a floor that defines a floor level, a storage system for storing paraphernalia therein comprising:
   an opening in the floor for allowing access to a proximate space that is below the floor level and close to the floor opening,
   at least one container for storing paraphernalia therein; and
   translation means for supporting the container at the proximate space and for moving the container from the proximate space to a stowage space that is below the floor level and distinct from the proximate space,
   wherein the translation means includes:

at least one wagon for supporting the container thereon, the wagon movable from the proximate space to the stowage space, and a rail system for guiding the motion of the wagon from the proximate space to the stowage space, wherein the rail system includes at least one rail that is configured in a closed loop.

14. For a building comprising a floor that defines a floor level, a storage system for storing paraphernalia therein comprising:

an opening in the floor for allowing access to a proximate space that is below the floor level and close to the floor opening, at least one container for storing paraphernalia therein; and translation means for supporting the container at the proximate space and for moving the container from the proximate space to a stowage space that is below the floor level and distinct from the proximate space, wherein the translation means includes:

at least one wagon for supporting the container thereon, the wagon movable from the proximate space to the stowage space, and a rail system for guiding the motion of the wagon from the proximate space to the stowage space, wherein the rail system includes at least one rail that is attached to an underside of the floor.

15. For a building comprising a floor that defines a floor level, a storage system for storing paraphernalia therein comprising:

an opening in the floor for allowing access to a proximate space that is below the floor level and close to the floor opening, at least one container for storing paraphernalia therein;

translation means for supporting the container at the proximate space and for moving the container from the proximate space to a stowage space that is below the floor level and distinct from the proximate space, wherein the translation means includes at least one wagon for supporting the container thereon, the wagon movable from the proximate space to the stowage space, the wagon having at least one wagon opening; and a jack positioned under the floor level, the jack including at least one arm moving through the wagon opening for raising the container from the wagon.

16. The storage system of claim 15, wherein the translation means includes a conveyor belt for serving the proximate space and the stowage space.

17. The storage system of claim 16, wherein the translation means further includes a guard rail for guiding the container to remain in the conveyor belt.

18. The storage system of claim 15, wherein the wagon includes a guard sized for receiving matingly the container thereon.

19. The storage system of claim 15, wherein the translation means further includes at least one more wagon, the wagons being coupled with each other.

20. The storage system of claim 15, wherein the translation means further includes a drive for moving the wagon from the stowage space to the proximate space.

21. The storage system of claim 15, further comprising a sensor for sensing a position of the wagon relative to the proximate space.

22. The storage system of claim 15, wherein the aim moves such that the container is raised through the floor opening.

23. The storage system of claim 15, wherein the translation means further includes a rail system for guiding the motion of the wagon from the proximate space to the stowage space.

24. The storage system of claim 23, wherein the rail system includes at least one rail that is configured in a closed loop.

25. The storage system of claim 23, wherein the rail system includes at least one rail that is attached to an underside of the floor.

26. The storage system of claim 23, wherein the floor is located above a grade, and wherein the rail system includes at least one rail that is supported by the grade.

* * * * *